United States Patent
Kato et al.

(10) Patent No.: US 8,427,714 B2
(45) Date of Patent: Apr. 23, 2013

(54) IMAGE-READING DEVICE

(75) Inventors: Tetsuya Kato, Aichi-ken (JP); Tatsuya Sato, Ichinomiya (JP); Takashi Matsumi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 373 days.

(21) Appl. No.: 12/830,554

(22) Filed: Jul. 6, 2010

(65) Prior Publication Data
US 2011/0026084 A1   Feb. 3, 2011

(30) Foreign Application Priority Data
Jul. 30, 2009 (JP) .................................. 2009-177796

(51) Int. Cl.
*H04N 1/04* (2006.01)
(52) U.S. Cl.
USPC ............ 358/474; 358/449; 358/496; 358/488
(58) Field of Classification Search .................. 358/449, 358/474, 496, 488
See application file for complete search history.

(56) References Cited

U.S. PATENT DOCUMENTS

| | | | | |
|---|---|---|---|---|
| 5,081,489 | A * | 1/1992 | Ishikawa et al. | 399/84 |
| 5,918,877 | A * | 7/1999 | Takei et al. | 271/261 |
| 8,228,568 | B2 * | 7/2012 | Yoshimoto et al. | 358/475 |
| 2003/0057626 | A1 * | 3/2003 | Nagao et al. | 270/58.08 |
| 2007/0264063 | A1 * | 11/2007 | Sano et al. | 399/367 |
| 2009/0180155 | A1 | 7/2009 | Kato et al. | |
| 2009/0185240 | A1 | 7/2009 | Kato et al. | |

FOREIGN PATENT DOCUMENTS

| | | |
|---|---|---|
| JP | 7-21347 | 1/1995 |
| JP | 2001-177699 | 6/2001 |
| JP | 2002-142084 | 5/2002 |
| JP | 2007-82047 | 3/2007 |
| JP | 2009-164807 | 7/2009 |

OTHER PUBLICATIONS

Official Action dated Jun. 28, 2011 received from the Japanese Patent Office from related Japanese Application No. 2009-177796, together with a partial English-language translation.

* cited by examiner

*Primary Examiner* — Twyler Haskins
*Assistant Examiner* — Helen Q Zong
(74) *Attorney, Agent, or Firm* — Scully, Scott, Murphy & Presser, PC (57) ABSTRACT

In an image-reading device, when the reading unit generates the set of image data, the top side is generated at first and the bottom side is generated subsequently to the top side. The scanned image includes a document image corresponding to the document. The specifying unit, when the reading unit scans and reads a part of the document and generates a part of the set of image data including a part of the document image, specifies a target vertex that is positioned at topmost among at least one vertex of the part of document image. The estimating unit defines a reference position in the scanned image corresponding to a center of the conveying path in the width direction, and estimates a size of the document based on a length in the second direction between the target vertex and the reference position.

6 Claims, 5 Drawing Sheets

DETECTION OF LEADING EDGE OF ORIGINAL DOCUMENT

FIG.4(b)

DETECTION OF EDGES NEAR POINT a

FIG.4(c)

DETECTION OF LEADING EDGE OF ORIGINAL DOCUMENT

FIG.5(a)
ESTIMATION OF SIZE OF ORIGINAL DOCUMENT

FIG.5(b)
DETECTION OF EDGE WHEN ORIGINAL IS NOT SKEWED

FIG.5(c)
DETECTION OF EDGE WHEN ORIGINAL HAS BENT CORNER

IMAGE-READING DEVICE

CROSS REFERENCE TO RELATED APPLICATION

This application claims priority from Japanese Patent Application No. 2009-177796 filed Jul. 30, 2009. The entire content of the priority application is incorporated herein by reference.

TECHNICAL FIELD

The invention relates to an image-reading device for reading an image from an original document and generating image data.

BACKGROUND

Japanese patent application publication No. H7-021347 proposes a method for identifying the size of an original document being scanned with a scanner or other image-reading device. More specifically, a facsimile machine or other image-transmitting device employing this method has a special pattern disposed at an image-reading position. When scanning an original document, the image-reading device of the image-transmitting device also reads this pattern as a background image to the original document. Subsequently, the image-transmitting device performs a pattern-detecting process to detect the pattern in the image data generated during the scanning operation and identifies the outline of the original document based on the results of this pattern-detection process. In this way, the image-transmitting device can identify the size of the original document with accuracy.

SUMMARY

However, the conventional image-transmitting device described above requires a considerable amount of time to identify the size of the original document because this size cannot be identified without scanning the entire original document.

In view of the foregoing, it is an object of the invention to provide an image-reading device capable of quickly identifying the size of an original document before completing the process of scanning and generating image data for the entire original document.

In order to attain the above and other objects, the invention provides an image-reading device. The image-reading device includes a conveying member, a reading unit, a specifying unit, and an estimating unit. The conveying member conveys a document along a conveying path extending in a conveying direction and having a width in a width direction orthogonal to the conveying direction such that the document is positioned at a center of the conveying path in the width direction. The document has a rectangular shape. The conveying path includes a reading point. The reading unit sequentially scans and reads the document at the reading point and generates a set of image data. The set of image data indicates a scanned image extending in a first direction corresponding to the conveying direction and a second direction corresponding to the width direction. The scanned image includes a top side and a bottom side confronting the top side in the first direction. When the reading unit generates the set of image data, the top side is generated at first and the bottom side is generated subsequently to the top side. The scanned image includes a document image corresponding to the document. The specifying unit, when the reading unit scans and reads a part of the document and generates a part of the set of image data including a part of the document image, specifies a target vertex that is positioned at topmost among at least one vertex of the part of document image. The estimating unit defines a reference position in the scanned image corresponding to a center of the conveying path in the width direction, and estimates a size of the document based on a length in the second direction between the target vertex and the reference position.

BRIEF DESCRIPTION OF THE DRAWINGS

The particular features and advantages of the invention as well as other objects will become apparent from the following description taken in connection with the accompanying drawings, in which:

FIG. 4(b) is an explanatory diagram illustrating a detection of a point a;

DETAILED DESCRIPTION

A scanner 1 according to an embodiment of the invention will be described while referring to the accompanying drawings wherein like parts and components are designated by the same reference numerals to avoid duplicating description.

Structure of a Scanner

First, the structure of the scanner 1 according to the embodiment will be described with reference to the block diagram of FIG. 1. The scanner 1 is configured with an automatic document feeder (ADF) and serves as the image-reading device of the invention.

Figure 1:
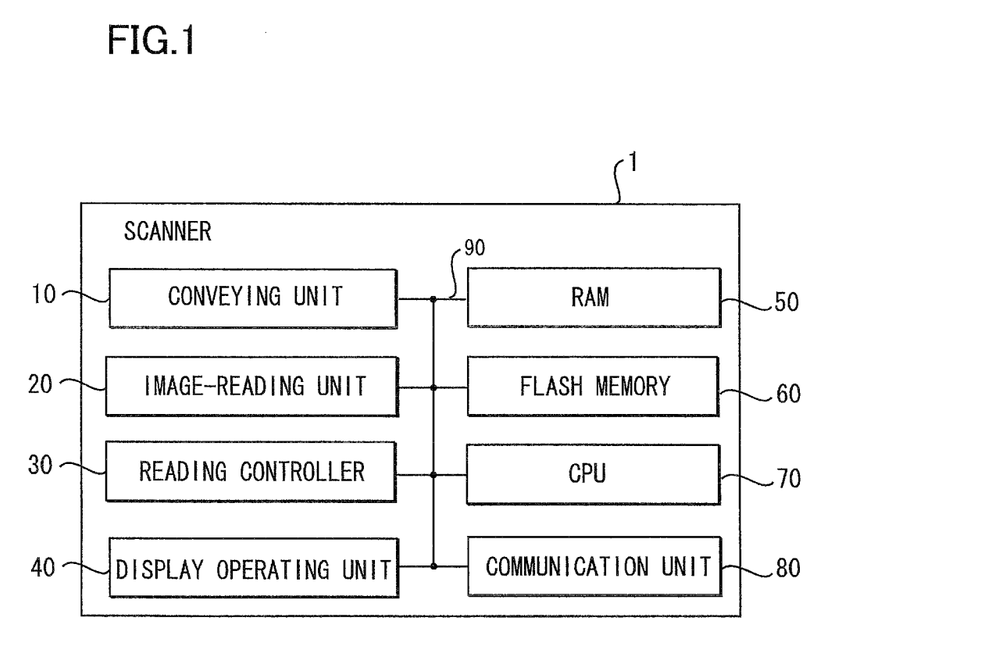
FIG. 1 is a block diagram showing a structure of a scanner according to an embodiment.

As shown in FIG. 1, the scanner 1 according to the embodiment includes a conveying unit 10 for automatically feeding a plurality of sheets of original documents placed in a document tray and sequentially conveying and guiding each sheet along a conveying path so that the sheets are maintained in the widthwise center of the conveying path; an image-reading unit 20 configured of a Compact Image Sensor (CIS) and the like disposed at a reading position along the conveying path; a reading controller 30 for controlling the image-reading unit 20 to scan each sheet of the original document passing through the reading position from the leading edge to the trailing edge of each sheet, and for sequentially generating image data from the scanned images of each sheet; a display operating unit 40 for accepting various user operations and displaying various information; a RAM 50 and a flash memory 60 for storing various data; a CPU 70 for executing various processes based on programs stored in the flash memory 60 to control the overall operations of the scanner 1; and a communication unit 80 that connects to a local area network (LAN) for communicating with a personal computer (PC) (not shown). All of these components of the scanner 1 are interconnected via a bus 90.

Operations of the Scanner

Next, an original document size estimation process performed when the scanner 1 executes a scanning operation on an original document set in the document tray of the ADF will be described with reference to the flowcharts in FIGS. 2 and 3. This process starts when the conveying unit 10 conveys the first sheet of the original document to the reading position on the conveying path and when the reading controller 30 begins a process to generate image data by scanning this first sheet.

In the following description, the direction within a scanned image represented by the scanned image data that corresponds to the main scanning direction of the image-reading unit 20 will be referred to as the "horizontal direction," and the direction within the scanned image that corresponds to the sub-scanning direction of the image-reading unit 20 (the conveying direction of the original document) will be referred to as the "vertical direction." In addition, the side of the image in the vertical direction that is scanned first will be the upper side, while the side scanned last will be the lower side. In the embodiment, a coordinate system is defined in the scanned image data. The coordinate system includes an X-axis oriented along the horizontal direction and a Y-axis oriented along the vertical direction (see FIG. 4(a)). In the embodiment, the conveying unit 10 conveys the sheet such that the leading edge of the sheet corresponds to the shorter dimension of the sheet. However, the conveying unit 10 may convey the sheet such that the leading edge of the sheet corresponds to the longer dimension of the sheet. In the embodiment, when the original document is scanned, the scanned image includes a document image corresponding to the original document and a background image that is located outside of a region of the document image.

Figure 4A:
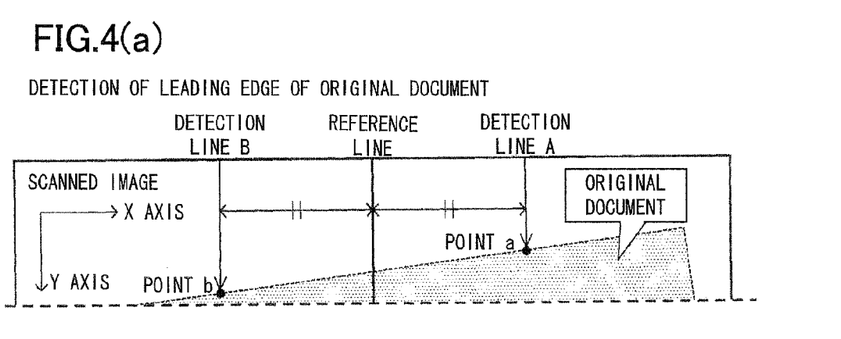
FIG. 4(a) is an explanatory diagram illustrating a detection of a trailing edge of an original document.

In FIG. 4(a) and subsequent drawings, a reference line is defined as a line in the scanned image that correspond to a line passing through the widthwise center of the conveying path. The reference line overlaps a line passing through center points on the leading and trailing edges of a rectangular original document in an image scanned when the original document passes through the reading position while positioned in the widthwise center of the conveying path. A detection line A and a detection line B parallel to the reference line are provided one on either side of the reference line. The detection lines A and B are positioned at equal distances from the reference line. The distance between the detection lines A and B is smaller than the length of the leading edge of the smallest standard size sheet that the scanner 1 can scan.

Figure 2:
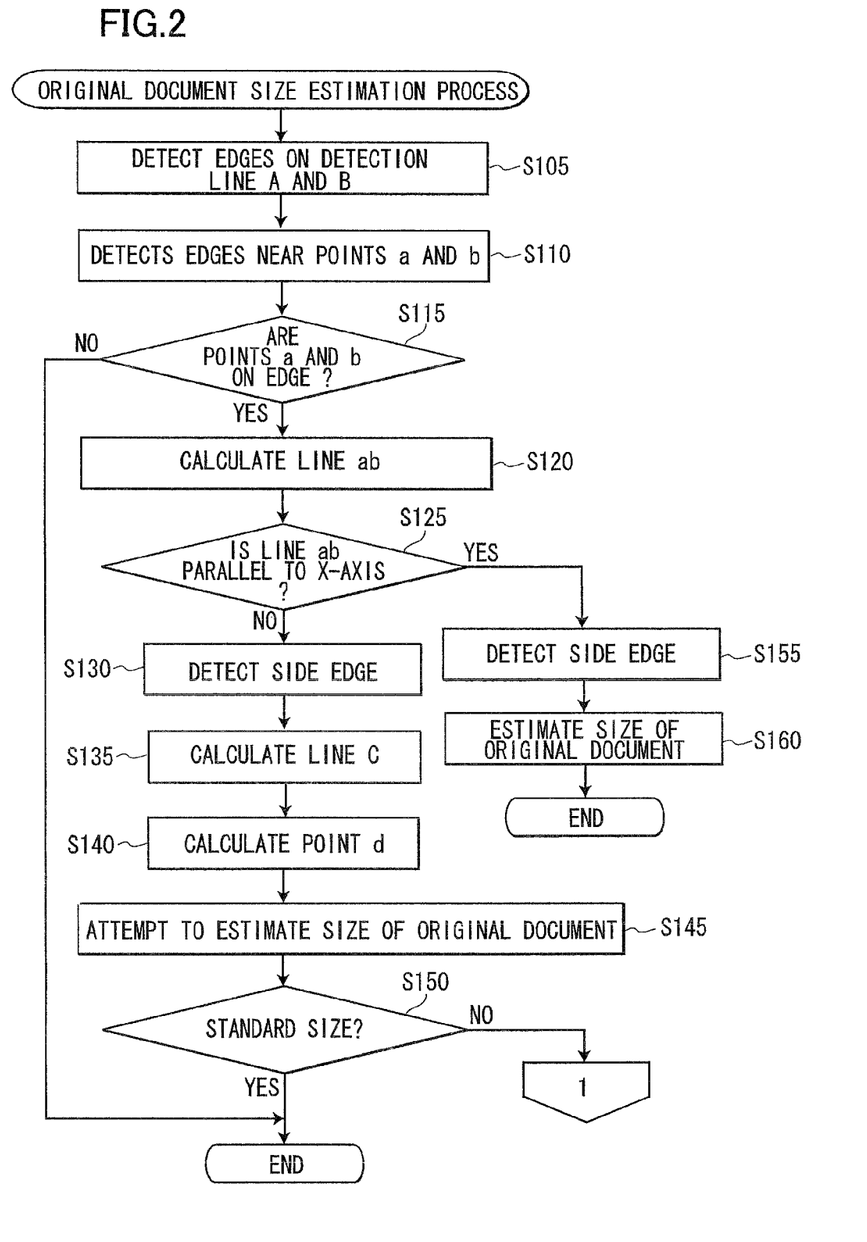
FIG. 2 is a flowchart illustrating a part of steps in an original document size estimation process.
Figure 3:
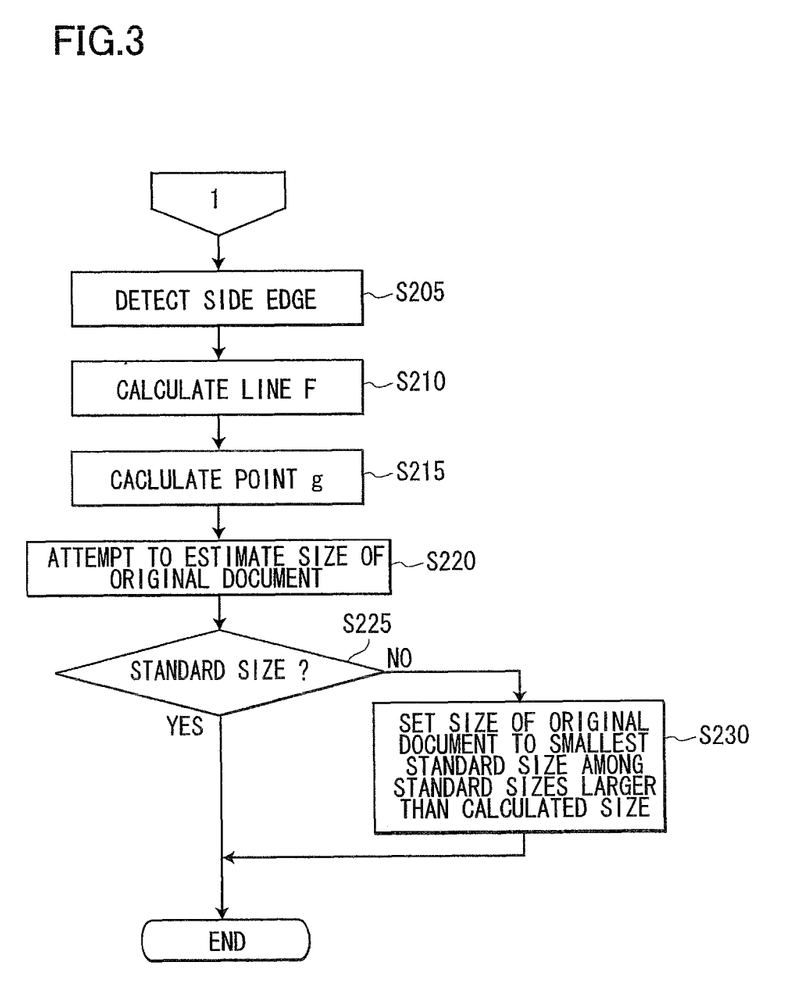
FIG. 3 is a flowchart illustrating a remaining part of steps in the original document size estimation process.

In S105 of FIG. 2, the CPU 70 of the scanner 1 analyzes pixels on the detection lines A and B in the scanned image data sequentially generated by the reading controller 30 to detect the leading edge of the original document on the detection lines A and B. When the CPU 70 detects the edge of the original document intersecting the detection lines A and B, the CPU 70 sets a point of the detected edge on the detection line A to a point a and a point of the detected edge on the detection line B to a point b, and identifies the coordinates of both the points a and b with respect to the X-axis and the Y-axis.

Figure 4B:
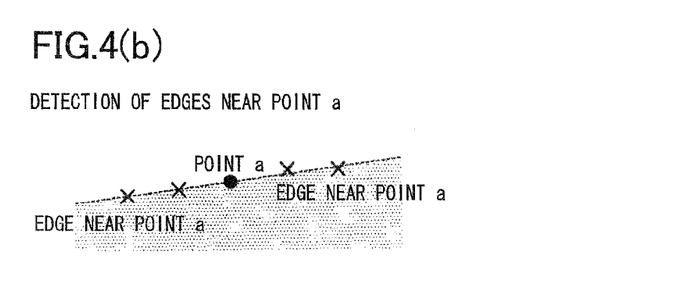

In S110 the CPU 70 detects a plurality of points corresponding to the leading edge of the original document near the points a and b, as illustrated in FIG. 4(b), and identifies the coordinates for the plurality of detected points. For example, the CPU 70 may detect edge points where a plurality of circles centered on the points a and b intersect the leading edge of the original document and identify the coordinates of the edge points. Alternatively, the CPU 70 may detect edge points where a plurality of lines positioned prescribed distances from the points a and b intersect the leading edge of the original document and identify the coordinates for the edge points. The radii of the circles centered on the points a and b and the prescribed distances of the plurality of lines from the points a and b may be set according to the length of the leading edge for the smallest sheet that the scanner 1 can scan. For example, if an A4-size sheet is the smallest sheet that the scanner 1 can scan, the CPU 70 may set the radii of the circles or the prescribed distances of the plurality of lines from the points a and b within a length of approximately 21 mm which corresponds to 10% of the length of the leading edge on an A4-size sheet when the leading edge corresponds to the shorter dimension of the sheet (210 mm).

In S115 the CPU 70 determines whether both the points a and b are points on the leading edge of the original document based on the coordinates for the edge points detected near the point a and the edge points detected near the point b, respectively. Specifically, if the point a and the edge points detected near the point a fall substantially on a straight line, the CPU 70 may determine that the point a falls on the leading edge of the original document. A similar determination may be made for the point b. The CPU 70 advances to S120 when a positive determination is made (S115: YES). The CPU 70 ends the original document size estimation process when a negative determination is made (S115: NO).

In S120 the CPU 70 calculates a line ab passing through the points a and b. In S125 the CPU 70 determines whether the line ab is parallel to the X-axis. The CPU 70 advances to S130 if not parallel (S125: NO).

In S130 the CPU 70 identifies the point a or b that is positioned lower than the other (hereinafter referred to as the "lower point"), and analyzes pixels beginning from the lower point and preceding along a line parallel to the X-axis that passes through the lower point in a direction toward the point a or b that is positioned above the other (i.e., the "higher point") in order to detect a side edge of the original document intersecting the line passing through the lower point (see FIG. 4(c)). After detecting the side edge along the line passing through the lower point, the CPU 70 sets the point at which the line passing through the lower point intersects the side edge of the original document to a point c and identifies the coordinates for the point c.

Figure 4C:
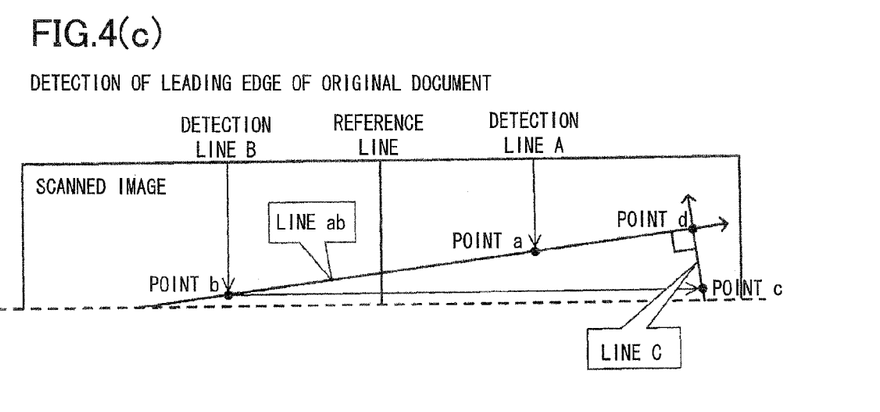
FIG. 4(c) is an explanatory diagram illustrating detections of a point d.

In S135 the CPU 70 calculates a line C orthogonal to the line ab that passes through the point c (see FIG. 4(c)). In S140 the CPU 70 calculates a point d at the intersection of the line C and the line ab (see FIG. 4(c)).

Figure 5A:
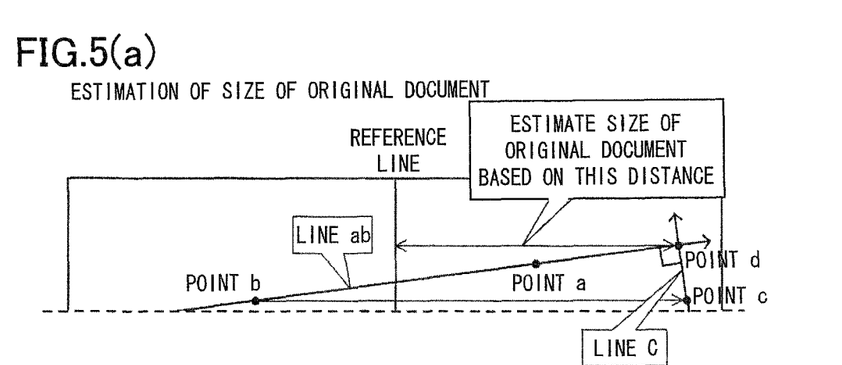
FIG. 5(a) is an explanatory diagram illustrating a detection of a trailing edge of the original document.

In S145 the CPU 70 calculates the distance along the X-axis between the point d and the reference line (see FIG. 5(a)) and attempts to estimate the size of the original document in the scanned image to be one of standard sizes of standard sheets such as A3, A4, by comparing the calculated distance with the lengths of the shorter edges of the standard sheets, in the embodiment. For example, the CPU 70 estimates that the size of the original document is the A4 size when the distance between the point d and the reference line is 10-13 cm and the A3 size when the distance is 20-23 cm.

In S150 the CPU 70 determines whether the CPU 70 has succeeded, in S145, to estimate the size of the original document to be one of the standard sizes. The CPU 70 ends the current process if a positive determination is made (S150: YES).

Figure 5B:
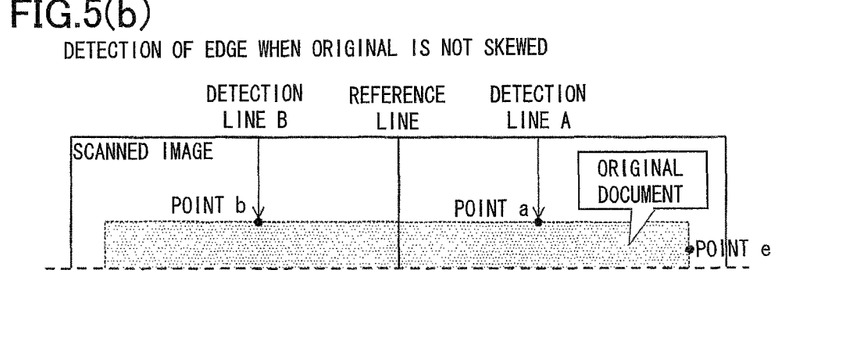
FIG. 5(b) is an explanatory diagram illustrating a detection of a trailing edge of the original document when the original document is not skewed.

On the other hand, if the CPU 70 determines in S125 that the line ab is parallel to the X-axis (S125: YES), in S155 the CPU 70 first waits for a prescribed time to elapse and then identifies the coordinates of a point e on a detected side edge of the original document (see FIG. 5(b)). For example, the CPU 70 may detect the side edges of the original document intersected by a line parallel to the X-axis and below the point a and may set one of the detected point as the point e. Alternatively, the CPU 70 may detect points on the edges of the original document that fall on a circle centered on the point a and may set one of the detected points positioned lower than the point a as the point e. Subsequently, the CPU 70 identifies the coordinates of the point e. Here, the prescribed time that the CPU 70 allows to elapse before performing this detection is the time required to generate scanned image data for the region of the original document corresponding to the point e and is set based on the position of the line parallel to the X-axis and below the point a or based on the radius of the circle used to detect the edges of the original document, as well as the scanning resolution and the like.

In S160 the CPU 70 calculates the distance along the X-axis between the point e and the reference line, estimates the size of the original document in the scanned image to be one of standard sizes of standard sheets such as A3, A4, based on the calculated distance. Then, the CPU 70 ends the original document size estimation process.

When the CPU 70 determines in S150 that the estimated size of the original document does not match one of the standard sizes (S150: NO), in S205 of FIG. 3 the CPU 70 first waits for a prescribed time to elapse and then detects a point f on a side edge of the original document at a position lower than the point c and identifies the coordinates for the point f (see FIG. 5(c)). For example, the CPU 70 may detect the side edges of the original document that intersects a line parallel to the X-axis and is positioned below the point c and may set one of the detected edges nearest the point c as the point f. Alternatively, the CPU 70 may detect points on the side edges of the original document that fall on a circle centered on the point c and may set one of the detected points positioned lower than the point c as the point f. Subsequently, the CPU 70 identifies the coordinates of the point f. Here, the prescribed time that the CPU 70 allows to elapse before performing this detection is the time required to generate scanned image data for the region of the original document corresponding to the point f and is set based on the position of the line that is parallel to the X-axis and is positioned below the point c or based on the radius of the circle used to detect the edges of the original document, as well as the scanning resolution and the like.

Figure 5C:
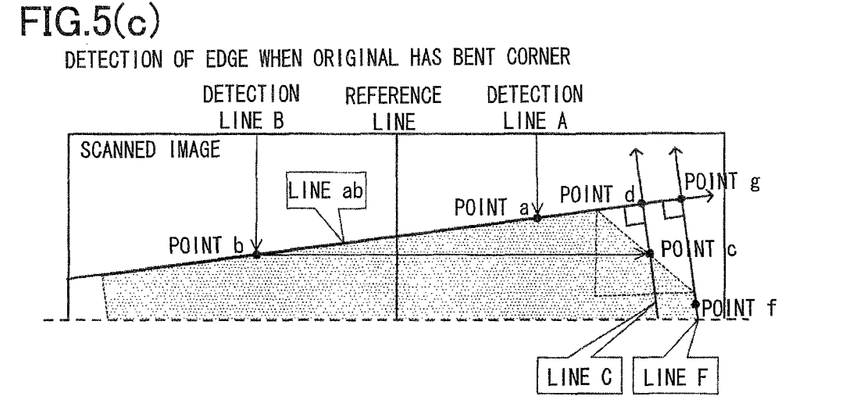
FIG. 5(c) is an explanatory diagram illustrating a detection of a trailing edge of the original document when the original document is skewed.

In S210 the CPU 70 calculates a line F orthogonal to the line ab that passes through the point f (see FIG. 5(c)). In S215 the CPU 70 calculates a point g at the intersection of the line F and the line ab (see FIG. 5(c)).

In S220 the CPU 70 calculates the distance on the X-axis between the point g and the reference line and attempts to estimate the size of the original document in the scanned image to be one of standard sizes of standard sheets such as A3, A4, by comparing the calculated distance with the lengths of the shorter edges of the standard sheets, in the embodiment. For example, the CPU 70 estimates the size of the original document to be the A4 size when the distance between the point g and the reference line is 10-13 cm and the A3 size when this distance is 20-23 cm.

In S225 the CPU 70 determines whether the CPU 70 has succeeded, in S220, to estimate the size of the original document to be one of the standard sizes. If a positive determination is made (S225: YES), the CPU 70 ends the current process. However, if a negative determination is (S225: NO), in S230 the CPU 70 sets the size of the original document to the smallest standard size among those standard sizes having shorter edges that are larger than the calculated distance between the point g and the reference line, and subsequently ends the current process.

EFFECTS OF THE EMBODIMENT

The scanner 1 according to the embodiment described above detects a leading edge of an original document in a scanned image that intersects the detection lines A and B and identifies the points on the detection lines A and B at the detected edge as the points a and b. When the original document is skewed in relation to the conveying direction, the scanner 1 can identify the coordinates for a corner (the point d) of the original document in the scanned image based on the points a and b and can estimate the size of the original document based on the distance along the X-axis between the point d and the reference line. Accordingly, the scanner 1 can quickly identify the size of the original document after only a leading edge portion of the original document has been scanned.

To identify the size of a skewed original document, the scanner 1 first sets a point c on a detected side edge of the original document that falls on a line extending along the X-axis and passing through the lower point among the points a and b. The scanner 1 then calculates a line C that is orthogonal to the line ab and passes through the point c and identifies the coordinates at the intersection of the line C and the line ab as the coordinates of the point d. Next, the scanner 1 attempts to estimate the size of the original document from among standard sizes based on the distance along the X-axis between the point d and the reference line. If the estimated size of the original document does not match one of the standard sizes at this time, the scanner 1 further detects a point f corresponding to the side edge of the original document at a position lower than the point c and repeats the process to identify the coordinates for a corner (the point g) of the original document based on the point f. Subsequently, the scanner 1 again attempt to estimate the size of the original document based on the distance between the point g and the reference line. Accordingly, the scanner 1 can estimate the size of the original document with great precision, even when the leading edge of the scanned original document has an imperfection, such as a bent corner.

When the original document is not skewed in relation to the conveying direction, the scanner 1 detects a point on the side edge of the original document below the point a as the point e, for example, and estimates the size of the original document based on the distance between the point e and the reference line. Accordingly, the scanner 1 can also estimate the size of the original document when the original document is not skewed in relation to the conveying direction.

Further, the scanner 1 detects points on the leading edge of the original document near the points a and b and confirms whether the points a and b fall on the leading edge of the original document based on the detected points. Therefore, the scanner 1 can improve the accuracy for estimating the size of an original document by estimating the size only when there is a high probability that the points corresponding to the leading edge of the original document were detected with precision.

VARIATIONS OF THE EMBODIMENT

While the invention has been described in detail with reference to the embodiment thereof, it would be apparent to those skilled in the art that various changes and modifications may be made therein without departing from the spirit of the invention.

(1) In the embodiment described above, the scanner 1 detects the leading edge of an original document by analyzing the scanned image data along the two detection lines A and B, but the scanner 1 may instead detect the leading edge along three or more detection lines. Further, the detection lines may be straight lines extending horizontally or straight lines sloped relative to the X-axis, for example. The detection lines also need not be configured of straight lines. The same effects described for the embodiment can be achieved with one of these variations.

(2) In the embodiment described above, after detecting the points a and b, the scanner 1 detects points on the leading edge of the original document near the points a and b to determine whether the points a and b actually fall on the leading edge. This process may also be performed for the points c, e, and f to improve the precision at which the scanner 1 can estimate the size of the original document.

(3) Further, the scanner 1 estimates the size of the original document from among standard sizes, but it is not always necessary for the scanner 1 to estimate the size of the original document as a standard size. For example, the scanner 1 may estimate the size of an original document from among sizes of documents that were previously scanned.

What is claimed is:

1. An image-reading device comprising:
    a conveying member that conveys a document along a conveying path extending in a conveying direction and having a width in a width direction orthogonal to the conveying direction such that the document is positioned at a center of the conveying path in the width direction, the document having a rectangular shape, the conveying path including a reading point;
    a reading unit that sequentially scans and reads the document at the reading point and generates a set of image data, the set of image data indicating a scanned image extending in a first direction corresponding to the conveying direction and a second direction corresponding to the width direction, the scanned image including a top side and a bottom side confronting the top side in the first direction, when the reading unit generates the set of image data, the top side being generated at first and the bottom side being generated subsequently to the top side, the scanned image including a document image corresponding to the document, the scanned image including a document region corresponding to the document image and a background region that is outside of the document region;
    a specifying unit that, when the reading unit scans and reads a part of the document and generates a part of the set of image data including a part of the document image, specifies a target vertex that is positioned at topmost among at least one vertex of the part of document image;
    an estimating unit that defines a reference position in the scanned image corresponding to a center of the conveying path in the width direction, and estimates a size of the document based on a length in the second direction between the target vertex and the reference position;
    a top point detecting unit that detects a plurality of detection points located on a border between the document region and the background region as points on a top edge of the document image;
    a first line specifying unit that specifies a first line passing through at least two points of the plurality of detection points;
    a first side point specifying unit that specifies a second line extending in the second direction and passing through a point downmost among the plurality of detection points and specifies a first side point that is located on the second line as a point located on a side edge of the document image; and
    a third line specifying unit that specifies a third line passing through the first side point and being orthogonal to the first line,
    wherein the specifying unit specifies an intersection point of the first line and the third line, as the target vertex.

2. The image-reading device according to claim 1, further comprising:
    a skew determining unit that determines whether the document is skewed in the conveying direction based on the plurality of detection points; and
    a second side point specifying unit that specifies, as a point located on the side edge of the document image, a second side point that is located in a prescribed region downside of the plurality of detection points and is located on a border between the document region and the background region,
    wherein the estimating unit estimates the size of the document based on a length in the second direction between the second side point and the reference position instead of estimating the size of the document based on the length in the second direction between the target vertex and the reference position in the second direction when the skew determining unit determines that the document is not skewed in the conveying direction.

3. The image-reading device according to claim 1, further comprising:
    a third side point specifying unit that, when the estimating unit fails to estimate the size of the document based on the target vertex and the reference position in the second direction, specifies, as a point on the side edge of the document image, a third side point that is located in a prescribed region downside of the first side point and is located on a border between the document region and the background region; and
    a fourth line specifying unit that specifies a fourth line that passes through the third side point and is orthogonal to the first line,
    wherein when the fourth line specifying unit specifies the fourth line, the specifying unit resets the target vertex to an intersection point between the first line and the fourth line,
    wherein when the specifying unit resets the target vertex, the estimating unit estimates the size of the document based on a length in the second direction between the reset target vertex and the reference position.

4. The image-reading device according to claim 1, wherein the top point detecting unit defines two detection lines extending in the first direction and is apart from the reference line by a prescribed length, the top point detecting unit detecting two detection points on the two detection lines, as the plurality of detection points.

5. The image-reading device according to claim 1, further comprising:
    a neighboring point detection unit that detects a neighboring point neighboring the detection point and being on the border between the document region and the background region; and a top edge determining unit that determines, based on the neighboring point, whether the detection point is on the top edge of the document image, wherein the estimating unit estimates the size of the document when the top edge determining unit determines that the detection point is on the top edge of the document image.

6. The image-reading device according to claim 1, wherein the estimating unit estimates the size of the document by determining whether the size of the document corresponds to one of a plurality of prescribed sizes based on the length in the second direction between the target vertex and the reference position.

* * * * *